United States Patent
Le Marchand

[11] 3,800,539
[45] Apr. 2, 1974

[54] TANDEM MASTER CYLINDER
[75] Inventor: Alain Le Marchand, Goussainville, France
[73] Assignee: Societe Anonyme D.B.A., Paris, France
[22] Filed: Mar. 8, 1973
[21] Appl. No.: 339,233

[30] Foreign Application Priority Data
Mar. 24, 1972 France .............................. 7210370

[52] U.S. Cl. .................................. 60/562, 60/589
[51] Int. Cl. ............................................. F15b 7/08
[58] Field of Search ....... 60/562, 581, 589; 180/345

[56] References Cited
UNITED STATES PATENTS
3,060,691  10/1962  Davis .................................. 60/562
3,296,798  1/1967  Shutt .................................. 60/562

FOREIGN PATENTS OR APPLICATIONS
887,631   1/1962   Great Britain ....................... 60/562
1,171,575  10/1958  France ................................ 60/589

Primary Examiner—Edgar W. Geoghegan
Assistant Examiner—A. M. Zupcic
Attorney, Agent, or Firm—Leo H. McCormick, Jr.; William N. Antonis

[57] ABSTRACT

A tandem master cylinder comprising a housing with a bore therein in which are slidably mounted in telescopic relationship a control piston and a floating piston of fingerstall shape. Tilting valves are also provided for permitting pressure chamber of the master cylinder to be refilled. Each tilting valve has a stem projecting into the path of one piston to be independently and directly operated thereby.

3 Claims, 1 Drawing Figure

PATENTED APR 2 1974                          3,800,539
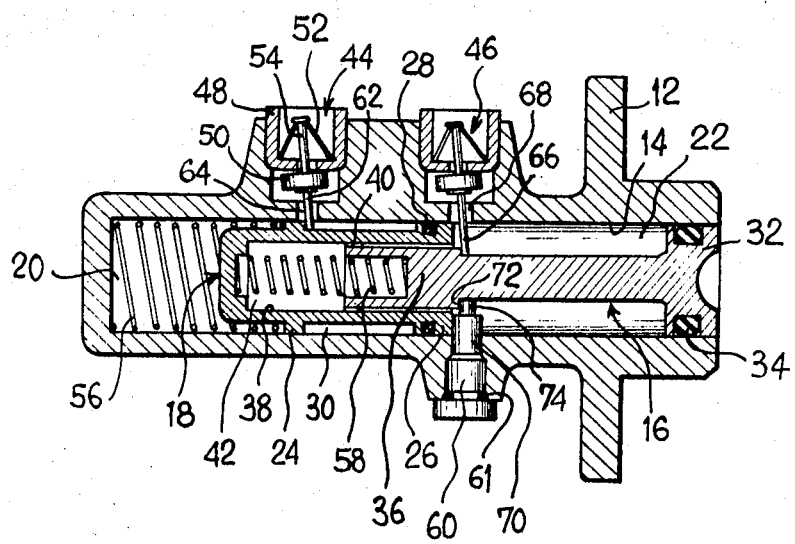

TANDEM MASTER CYLINDER

The invention relates primarily to a tandem master cylinder with a floating piston for use, for example, in a dual brake circuit for a motor vehicle.

Tandem master cylinders with floating pistons generally have the disadvantage of being relatively long and bulky, since because the front end of each piston (in relation to the hydraulic fluid replenishing orifice) forms a slide valve, the length required for each brake circuit is at least equal to the length of the piston plus the working stroke of this piston. To make master cylinders less bulky a telescopic arrangement of the two pistons has been proposed. However, this leads to problems in replenishing the two variable-volume chambers, which have meant an increase in the number and complexity of the components of the master cylinders.

The invention therefore proposes a more compact master cylinder of simple and robust design, more particularly, a tandem master cylinder with a floating piston, comprising a housing with a bore in which an assembly comprising two pistons telescopic relative to one another is slidably mounted so as to define two variable-volume chambers, wherein each chamber communicated with a hydraulic fluid reservoir by way of a valve having a tiltable closure member and having a stem which projects into the path of the said piston assembly so as to be operated independently and directly by one of the two pistons.

The invention will be described referring to the accompanying drawing in which the single FIGURE illustrates a cross-sectional view of a tandem master cylinder for a dual brake circuit.

The master cylinder illustrated in the single FIGURE has a housing 12 in whose bore 14 an actuating piston 16 and a floating piston 18 are slidably mounted so as to define two variable-volume pressure chambers 20, 22 in the bore, the chambers being connected by orifices (not shown) to two respective, conventional, independent brake circuits in a motor vehicle. The floating piston 18 is in the form of a hollow cylinder, and its outside surface is provided with two axially spaced annular bosses which slide in the bore 14. As the FIGURE shows, the piston 18 has a centering boss 24 and a sealing boss 26 with a seal 28 so that the two chambers 20, 22 are hydraulically separate. A passage (not shown) is provided between the annular space 30 situated between the bosses and the front chamber 20, situated between the floating piston and the end of the bore 14.

The actuating piston 16 is telescopic relative to the piston 18. As the FIGURE shows, the piston 16 is stepped and has at one end an annular boss 32, cooperating with the interior of the bore 14 by way of a seal 34, which cuts off the pressure chamber 22 situated between the two pistons from the atmosphere. The other end of the piston 16 comprises a head 36 slidably mounted in the central bore 38 in the floating piston, grooves 40 being provided in the head 36 to allow the fluid to pass freely between the chamber 22 and the cavity 42, which is situated between the head 36 and the end of the bore 38.

Two cylindrical return coil springs 56, 58 urge the two pistons into their idle position, in which they bear on a positioning screw 60 which is inserted in the wall of the housing, and of which the outer end has a seal 61 and the inner end projects radially into the chamber 22. The spring 20 is compressed between the end of the bore 14 and the centering boss 24, whose axial position on the floating piston 18 leaves enough space to enable the turns of the spring to close up without being damaged during operation of the master cylinder. For the same reason the two ends of spring 58, which is compressed between the end of the floating piston and the head 36 of the actuating piston, are housed in two mutually opposite coaxial recesses.

Replenishing of the two pressure chambers 20, 22 with hydraulic fluid is effected by two valves 44, 46 having tiltable closure members and communicating with respective hydraulic fluid reservoirs (not shown). Each valve is formed of a seat 48 screwed into a threaded opening in the body, and of a tiltable closure member 50 with a ring seal (not shown), the closure member being normally urged into the closed position by a compressed conical, helical spring 52, arranged conventionally between the seat and the flat head of an actuating stem 54 as shown in the FIGURE.

The actuating stem 62 of the valve 44 projects through the replenishing orifice 64 of the chamber 20 and into the bore 14 between the bosses 24, 26, on the piston 18. The actuating stem 66 of the valve 46 projects through the replenishing orifice 68 of the chamber 22 and into the bore 14 between the centering head 36 and the boss 32 on the piston 16.

The FIGURE shows the master cylinder in its idle position, that is, in a position in which the valves are opened. The initial tension of the spring 56 is greater than that of the spring 58, so that the floating piston comes to bear on a larger-diameter cylindrical portion 70 of the screw 60, whereas an annular shoulder 72 on the head 36 comes to bear on a smaller-diameter cylindrical portion 74 provided on the free end of the screw 60.

The respective positions of the orifices 64, 68 and of the screw 60 in the body are such that when the pistons are in their idle positions the stem 62, bearing on the right-hand side of the boss 24 (in relation to the FIGURE) is tilted so as to open the valve 44, whereas the stem 66 bearing on the shoulder 72 is tilted so as to open the valve 46. As the FIGURE clearly shows, the lengths of the stems 62, 66 and of the permissible strokes of the pistons in the bore 14 are such as to prevent the pistons from damaging the valves. In particular, the screw 60, which is substantially opposite the orifice 68, forms an abutment to protect the valve 46 if the stroke of the actuating piston lengthens due to a fault in the brake circuit associated with the chamber 20. Lastly, the different diameters of the portions 70 and 74 of the positioning screw 60 prevent the floating piston from interfering with the valve 46.

The operation of the tandem master cylinder with floating piston described above is conventional and will not be described in detail. It should be noted, however, that when the operator of the vehicle moves the actuating piston 16 along the bore 14, the spring 58 is compressed first and causes the valve 46 to close. The pressure therefore rises in the chamber 22, so that the piston 18 moves and the valve 44 closes. The dimensions of the components of the master cylinder and the calibration of the springs may be such as to cause the two valves to close substantially simultaneously, or such as to increase the delay before closure of the valve 44 so that the master cylinder can be used in a vehicle brake circuit which normally required a retarding valve, for example a dual brake circuit with one disc brake circuit and one drum brake circuit.

What is claimed is:

1. A tandem master cylinder comprising a housing with a bore therein, an assembly comprising two pistons telescopic relative to one another being slidably mounted in said bore, so as to define two variable-volume chambers, said assembly comprising a floating piston of fingerstall shape slidably mounted in the bore in the housing and cooperating with the inside wall of said bore by way of an annular centering boss and by way of an annular sealing boss, and a stepped actuating piston having a centering head slidably mounted in the inner bore in the floating piston and a sealing boss slidably mounted in the bore in the housing, resilient means being provided to urge each piston into an idle position which is fixed relative to the housing, each chamber communicates with a hydraulic reservoir by way of a valve having a tiltable closure member and each having a valve stem which projects into the path of said piston assembly, the valve stems cooperating by direct abutment respectively with the centering boss on the floating piston and a shoulder on the centering head, so as to permit independent replenishment of both variable-volume chambers when the two pistons are urged into their idle positions.

2. A master cylinder as claimed in claim 1, further including:

stop means having a radial projection which is fixed to the housing and whose inner end projects into the bore in the housing substantially opposite the orifice of that valve controlling replenishing of the variable-volume chamber situated between the two pistons, so as to cooperate by direct abutment with the sealing boss on the floating piston and with the centering head of the actuating piston.

3. A master cylinder as claimed in claim 2, wherein said projection includes:

a screw mounted in a fluid-tight manner in an opening provided in the housing, the inner end of the screw comprising two coaxial cylindrical portions of larger and smaller diameters on which the floating piston and the actuating piston respectively come to bear, so that the sealing boss of the floating piston cannot interfere with the shoulder on the centering head during operation of the valve associated with the actuating piston.

* * * * *